United States Patent [19]

Marsh

[11] Patent Number: 5,658,461
[45] Date of Patent: Aug. 19, 1997

[54] SEDIMENTATION APPARATUS

[75] Inventor: Philip Marsh, Hitchin, United Kingdom

[73] Assignee: Thames Water Utilities Limited, United Kingdom

[21] Appl. No.: 436,385

[22] PCT Filed: Nov. 8, 1993

[86] PCT No.: PCT/GB93/02292

§ 371 Date: Aug. 28, 1995

§ 102(e) Date: Aug. 28, 1995

[87] PCT Pub. No.: WO94/11081

PCT Pub. Date: May 26, 1994

[30] Foreign Application Priority Data

Nov. 16, 1992 [GB] United Kingdom ............... 9332955

[51] Int. Cl.⁶ .............................................. B01D 21/00
[52] U.S. Cl. ..................... 210/519; 210/521; 210/525; 210/540
[58] Field of Search .................... 210/519, 521, 210/525, 526, 538, 540

[56] References Cited

U.S. PATENT DOCUMENTS

| | | | |
|---|---|---|---|
| 2,861,692 | 11/1958 | Humphrey | 210/521 |
| 2,973,866 | 3/1961 | Gunter | 210/519 |
| 3,640,387 | 2/1972 | Conley et al. | 210/522 |
| 4,045,344 | 8/1977 | Yokota | 210/521 |
| 4,351,733 | 9/1982 | Salzer et al. | 210/521 |
| 4,514,303 | 4/1985 | Moore | 210/525 |
| 4,595,504 | 6/1986 | Hellman et al. | 210/519 |
| 4,701,260 | 10/1987 | Lee | 210/521 |
| 4,793,926 | 12/1988 | Vion | 210/521 |
| 4,883,603 | 11/1989 | Roygenstein et al. | 210/521 |
| 5,049,278 | 9/1991 | Galper | 210/521 |
| 5,288,404 | 2/1994 | Marsh | 210/519 |

FOREIGN PATENT DOCUMENTS

| | | |
|---|---|---|
| 245140 | 11/1987 | European Pat. Off. |
| 2688416 | 9/1993 | France . |
| 4322705 | 11/1992 | Japan . |

Primary Examiner—Christopher Upton
Attorney, Agent, or Firm—Blakely Sokoloff Taylor & Zafman

[57] ABSTRACT

The invention relates to sedimentation apparatus (1) for treating liquid containing solids, such as sewage, whereby solid constituents of the liquid are substantially removed for subsequent handling/treatment and the liquid now clean of solids is taken off separately for subsequent treatment. To the end, the apparatus (1) comprises two lamella separators (2) the flow channels (3) of which are at an angle to the direction of flow "S" of liquid containing solids towards the inlet (4) to the separators. In the embodiment the angle is substantially 90°.

26 Claims, 4 Drawing Sheets

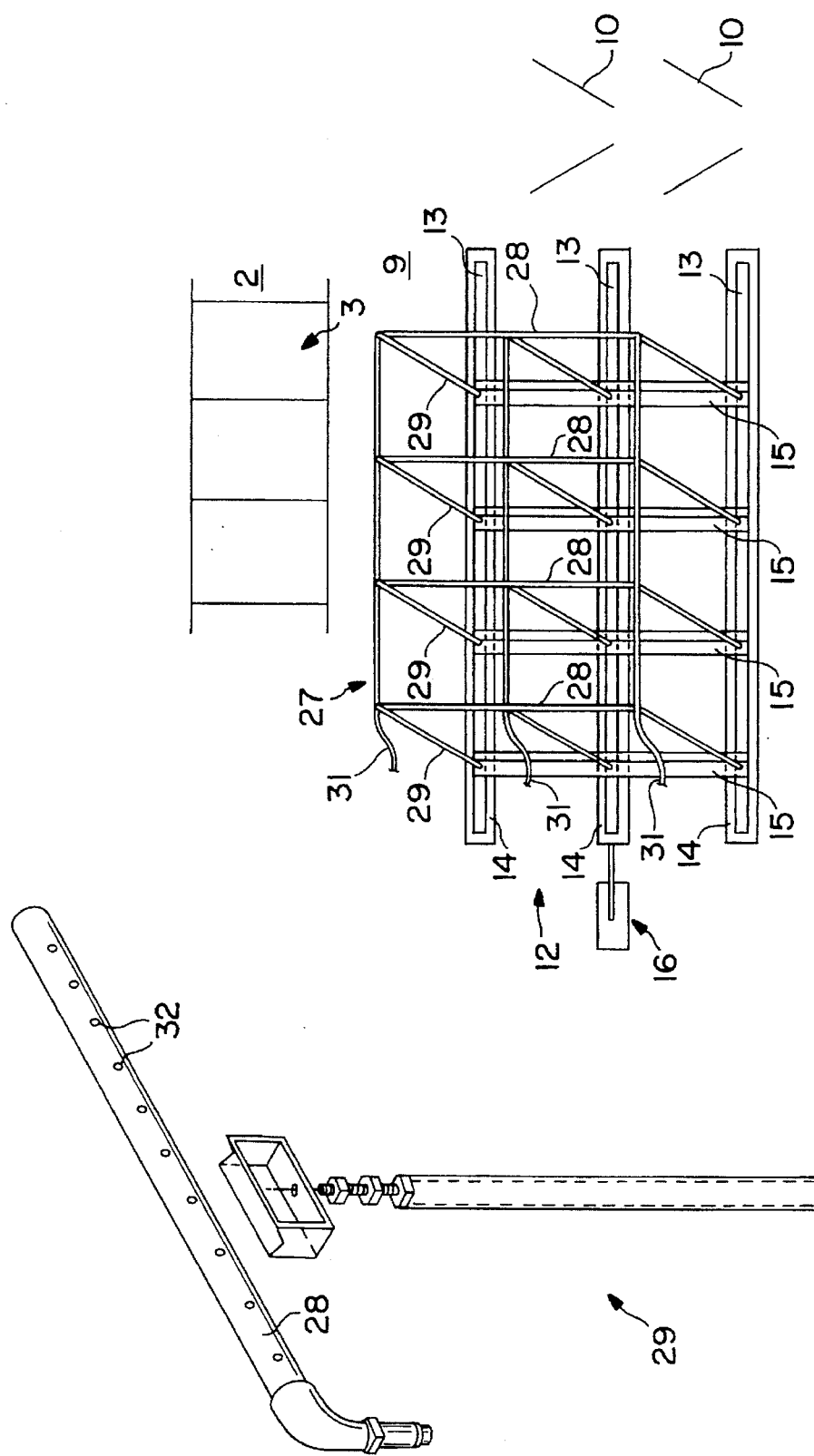

SEDIMENTATION APPARATUS

The invention relates to sedimentation apparatus, particularly to such apparatus including a lamella separator.

It will be understood that the expression lamella separator used herein refers to a pack, set, cassette or the like of spaced plates of undulating configuration, adjacent plates being joined at the crests of the undulations to provide channels through which a liquid can flow, the flow being generally laminar. Such separators are usually arranged so that the channels are inclined to the vertical, and a liquid usually containing solids in suspension is passed through channels from the lower end to the upper end (as considered in use) so that solids separate from the liquid and fall back under gravity down the channels to the lower end of the lamella separator, which lower end thus also provides an outlet for separated solids as well as an inlet for liquid containing solids. The upper end of the separator then forms an outlet for liquid from which solids have been substantially removed by passage through the separator.

There may be more than one separator in a sedimentation apparatus and the or each separator may be removed bodily from the apparatus.

U.S. Pat. No. 2,973,866 and EP-A-0245140 relate to lamella separators which generally seek to act on sewage, but do not provide an efficient means for separating solid contents thereof.

According to a first aspect of the invention there is provided sedimentation apparatus for separating solids from a liquid containing same, characterised by at least one lamella separator the flow channels of which are at an angle to the direction of flow 'S' of liquid containing solids towards the inlet to the separator, characterised by distribution means comprising a channel for receiving incoming liquid containing solids and directing it downwardly through the apparatus to the inlet to the separator, by means for passing liquid containing solids to one end of the channel, and by inlet means along the channel adapted for passing said liquid from the channel towards the inlet to the separator.

The angle may be at substantially 90° to said flow direction. This provides for extension of the apparatus in a modular fashion, longitudinally and/or laterally.

There may be two sets of lamella separators in the apparatus, the channel being substantially centrally situated therebetween. This provides for an efficient construction and operation.

There may be five spaced nozzles in a base of the channel. This provides for optimum distribution.

There may be means to maintain grease, fat and the like suspended in the liquid in the channel. This assists in prevention of clogging, particularly where the means may comprise a gas distribution means extending along the channel.

The distribution means may comprise a pipe in the channel with spaced air outlets. This is a relatively simple distribution means.

The pipe may be along one side of the channel, or alternatively, there may be two pipes, which may extend along both sides of the channel. Either construction provides for efficient flotation.

There may be means to remove scum from liquid in the channel. This assists in maintaining the separator clean.

The scum removal means may comprise a weir, suitably a normally submerged weir at an end of the channel opposite an inlet for the liquid. This provides for a *shearing of scum from the liquid surface.

The weir may lead to a scum receiver having a normally closed valve means which may be openable to lower the level of scum and/or liquid in the receiver, whereby the weir acts to remove the scum.

There may be separated solids receiver means of the apparatus, suitably comprising a plurality of hoppers at one end of the apparatus and means to direct the solids to the hoppers.

The means to direct the solids may comprise a scraper device. This provides for relatively efficient sludge removal.

The scraper device may comprise a frame with transverse scraper blades and means for reciprocating the scraper device.

The scraper device may be operated intermittently. This is energy-conserving.

There may be means for cleaning the or each lamella separator, preferably comprising means for passing a cleaning fluid towards a solids outlet of the or each separator. This acts as a sponge device for cleaning.

The means may comprise a system of distributors below the or each lamella separator. This is a construction which is economical of space.

The distributors may comprise diffuser pipes extending transversely of the apparatus below the or each separator, and the system may be reciprocably mounted below the or each separator.

Suitably the system may be mounted on the scraper device. This provides a compact yet efficient arrangement.

The diffuser pipes may be substantially parallel and set at approximately the pitch of the blades of the scraper device. This provides for cleaning of substantially the whole of the under surface area of a separator. The cleaning fluid may be air, or alternatively water.

Sedimentation apparatus embodying the invention is hereinafter described, by way of example with reference to the accompanying drawings.

FIG. 8 is an enlarged exploded view of a riser of the system of FIG. 7; and

FIG. 9 is a detailed view of the laminar plate cleaning system of FIG. 7.

Figure 1:
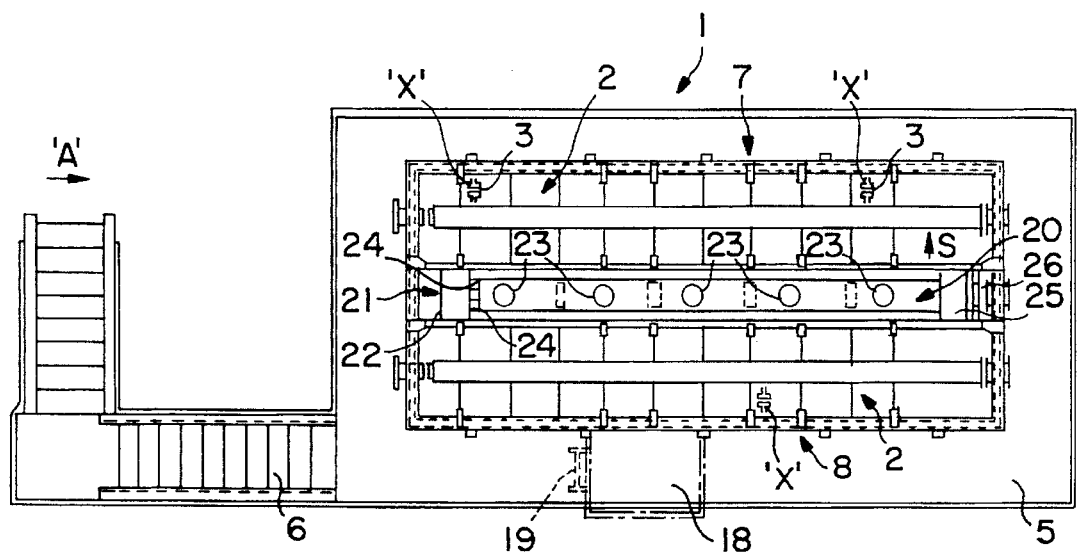
FIG. 1 is a plan view of sedimentation apparatus including lamella separators according to the invention.

Referring to the drawings, there is shown sedimentation apparatus 1 for treating liquid containing solids, such as sewage, whereby solid constituents of the liquid are substantially removed for subsequent handling/treatment and the liquid now clean of solids is taken off separately for subsequent treatment.

To the end, the apparatus 1 comprises two lamella separators 2 the flow channels 3 of which are at an angle to the direction of flow 'S' of liquid containing solids towards the inlet 4 to the separators. In the embodiment the angle is substantially 90°.

In the embodiment too, the sedimentation apparatus 1 is substantially rectangular in plan and is open topped, and has a catwalk or walk-way 5 at an upper level adjacent the open top, the walk-way being gained by a stair 6.

Figure 2:
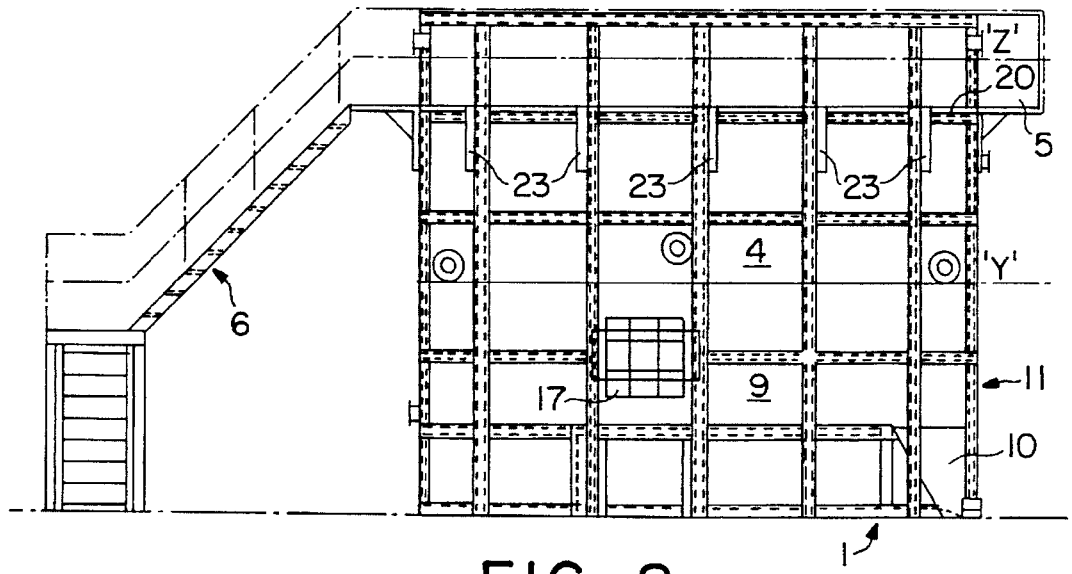
FIG. 2 is a side elevational view of the apparatus of FIG. 1.
Figure 3:
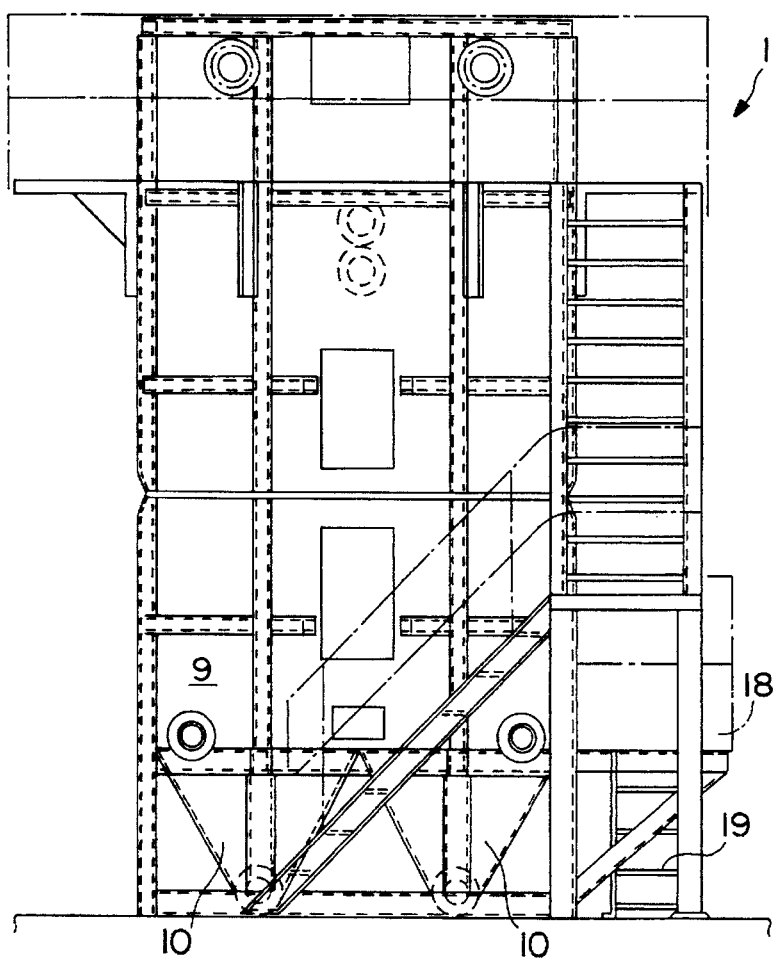
FIG. 3 is an end elevational view of the apparatus taken on arrow 'A' in FIG. 1.
Figure 4:
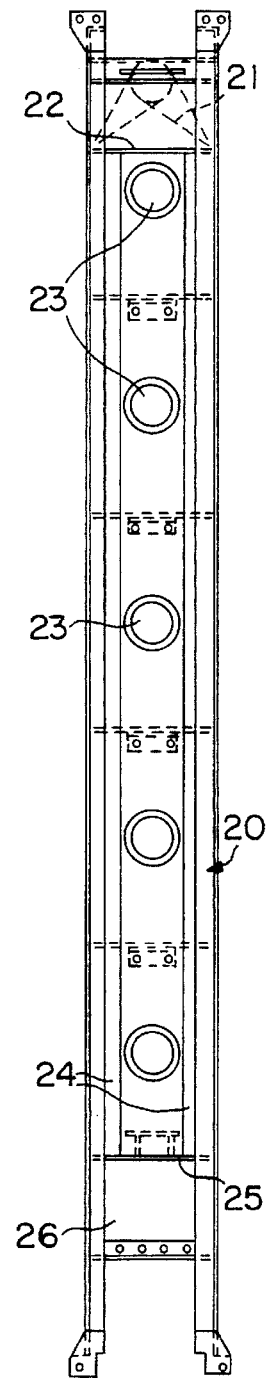
FIG. 4 is an enlarged view of a central channel of the apparatus of FIGS. 1 to 3.
Figure 5:
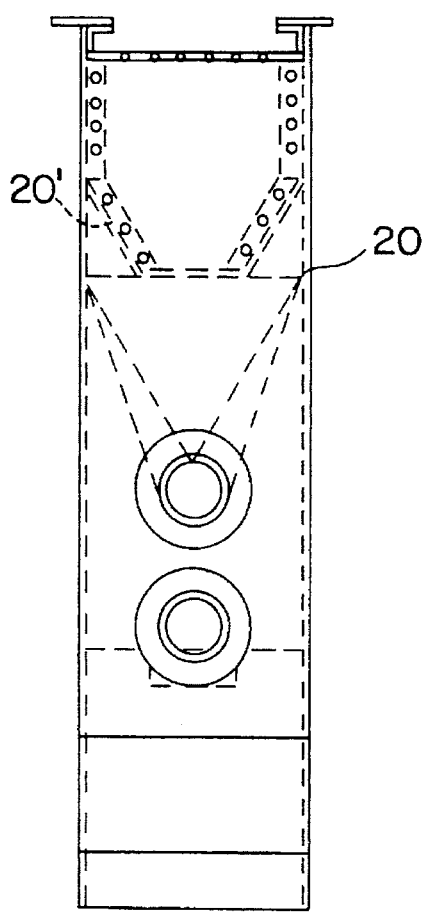
FIG. 5 is a side view of part of distribution means of the apparatus of FIGS. 1 to 3.
Figure 6:
FIG. 6 is an enlarged view of a distribution nozzle of the distribution means of FIG. 5.
Figure 7:
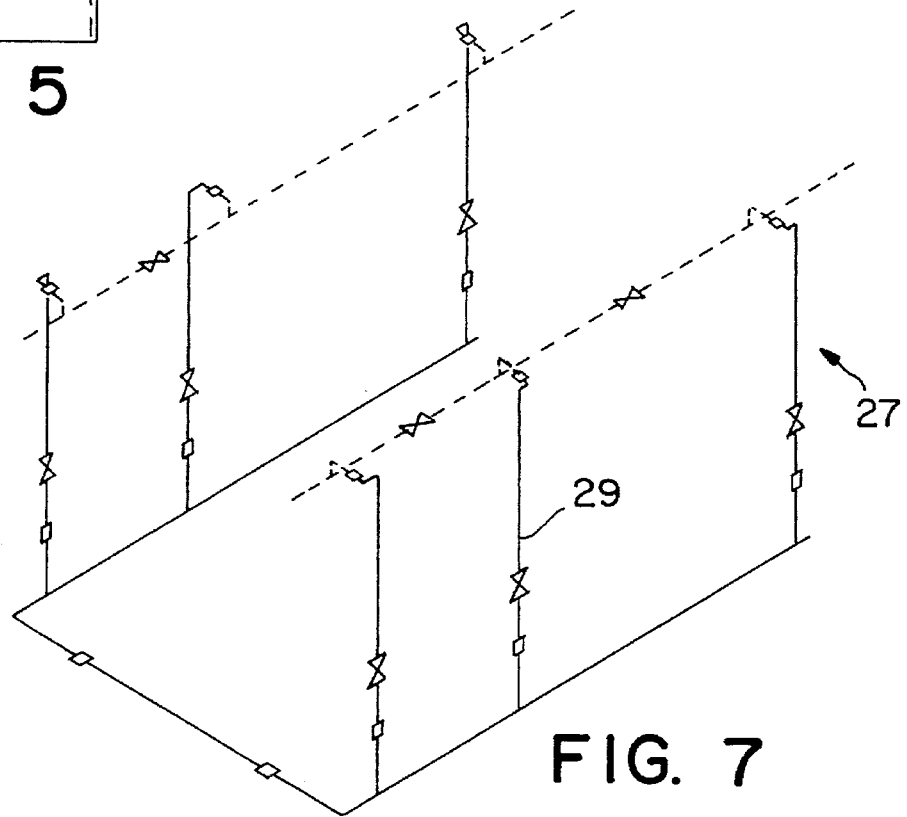
FIG. 7 is a schematic perspective view of a lamella separator plate cleaning system according to the invention.

There are two banks of lamella separators 2 along each side 7, 8 of the apparatus 1, the plates of the separators being indicated at 'X' in FIG. 1, the bottom (as viewed) or inlet of the separators being at the level 'Y' (FIG. 2) and the liquid outlet from the separators being at the top, 'Z'.

The lower part of the part of the apparatus 1, below the separators 2, is a receptacle 9 in which solids in the form of sewage sludge is collected when that sludge, separated from the liquid in the lamella separators 2, passes out of the lower outlet end of those separators. The sludge is periodically removed to sludge collecting means in the form of two conical hoppers 10 at one end 11 of the apparatus 1. Removal is effected by a reciprocable scraper device 12 comprising a frame having in the embodiment three longitudinally extending and substantially parallel bars or shoes 13 each of which sits on a longitudinally extending pad of plastic 14 on the base of the apparatus and which provides for relatively friction free reciprocation. The bars or shoes 13 carry transverse scraper blades 15 of wedge shape so that the inclined face of the wedge pushes sludge towards and into the hoppers 10 for subsequent handling. The device 12 includes a reciprocable piston and cylinder arrangement 16, usually hydraulic, for operation.

Access to the sludge receptacle 9 is gained through a door 17, in a side wall of the apparatus 1, there being a platform 18 reached by a stair 19, adjacent the door 17 so that an operative can stand on the platform to gain access to the door.

Extending longitudinally of the apparatus 1 between the banks of lamella separators 2 is a channel 20. This channel 20 is a distributor means for incoming liquid to be treated, and is situated at the top of the apparatus 1.

The channel 20 is thus at or adjacent the upper ends of the lamella separators 2, which upper ends provide the outlet for liquid from which solids have been separated after passage through the lamella separators 2 from the bottom, the inlet thereto. Sewage to be treated passes up a riser stilling chamber 21 at one end of the channel and flows into the channel 20 over plate 22. The sewage then passes down distribution means in the form of five spaced tubes 23 with conical inlets 20' to chambers holding the lamella separators 2 which are flooded upwardly, as described previously, for separation of sewage as sludge, which then passes to the receptacle 9 for ultimate removal to the hoppers 10. The channels of the separators are inclined in the general direction of the longitudinal axis of the apparatus 1. The liquid to be treated, as it comes from a central channel, passes laterally to the separator channels, that is the axis of the channels in the separators are at right angles to the flow direction to the separators 2. This arrangement provides for flexibility in that the apparatus 1 can be scaled up both longitudinally and/or laterally as desired by adding on as many lamella separators as desired. The apparatus 1 is therefore modular.

In the channel 20 is flotation means in the form of an air pipe 24 along each side of the channel 20, the pipes 24 each having spaced air outlets for passing air into the liquid in the channel 20. This air contacts light solid fractions such as grease and fats and floats these constituents whilst keeping other solids suspended. The fats or greases therefore mostly do not pass to the separators 2, which could be blocked thereby, and are removed in a manner to be described. In an alternative there is an air distributor or diffuser pipe 24 along only one side of the channel 20. Air passing into the liquid, in the channel 20 at this one side effectively reduces the density of the liquid at that side. This promotes a circular or spiral flow in the liquid as the denser as the denser liquid at the other side displaces the lighter liquid. A scouring action is thus set up which keeps the solids suspended, whilst floating the grease and fat to the surface.

At the end of the channel opposite the riser entry or stilling chamber 21 for the liquid to be treated there is a normally submerged weir 25 forming an entry to a sump 26. The channel 20 has a flat bottom but because of the liquid flow being from one end, the tendency is for the liquid to flow to the end adjacent the weir 25. In doing so, light matter such as scum and floated grease and fat collects at the end of the channel 20 adjacent the weir 25. When sufficient scum has been built up over the weir 25 to merit removal, a normally closed valve (not shown) at the bottom of the sump 26 is opened, the liquid level drops, and the scum is effectively creamed or "chopped off" by the weir 25 and falls into the sump 26 for disposal to drain. Alternatively the scum could be passed to the hoppers 10, the valve is closed, and fresh scum is collected as it is pushed by the incoming liquid flow to the weir end of the channel 20.

The incoming liquid can be fed to the channel by any desirable means providing it ultimately enters the channel at the end opposite the weir 25.

Although fat and grease is floated off the liquid, some is passed to the lamella separators 2 the channels 3 of which can become clogged with plugs of fat and grease, or even other material such as rag, at the bottom of the channels. To seek to overcome this, the apparatus 1 includes a plate cleaning system 27 which in the embodiment is a frame of air distribution pipes 28 which is mounted on the scraper frame 12 and thus reciprocates bodily with that scraper frame. The air distribution pipes 28 effectively provide an air sponge system.

The pipes 28 are transverse, like the scraper blades 15, and are mounted on risers 29. There are flexible air lines 31 feeding the pipes 28 with air from an air manifold. The air diffuses out through air holes 32 in the pipes 28, above the level of the sludge. There is a transverse pipe at every scraper blade, in other words the adjacent pipes 28 are set at the pitch of the scraper blades 15. Thus, as the scraper device 12 reciprocates, the whole of the underside surface area of the separators 22 is covered. The air can be introduced continuously or intermittently and, in rising up, air bubbles from the diffusers dislodge any plugs in the separator channels. An alternative plate cleaning system utilises water, issuing as streams, jets or bursts from the pipes 28. In this case, the water level in the sludge receptacle would be lowered to below the level of the pipes by suitable valving, before the water issues for cleaning the plates.

In either embodiment, cleaning can take place intermittently, when desludging, which could be on a weekly bases, or as desired.

The body of the apparatus 1 is usually fabricated from metal plates (the separators could be and usually are plastic plates), but the apparatus could be built in situ from concrete, and the channel could be concrete.

I claim:

1. Sedimentation apparatus for separating solids from a liquid containing same, comprising at least one lamella separator including flow channels and an inlet thereto, the flow channels being disposed at an angle to the direction of flow 'S' of liquid containing solids towards the inlet to the separator, distribution means including a receiving channel for receiving incoming liquid containing solids and directing it downwardly through the apparatus to the inlet to the separator said receiving channel further including means to maintain grease, fat, and the like suspended in the liquid in the channel means for passing liquid containing solids to one end of the receiving channel, and inlet means along the receiving channel for passing said liquid from the receiving channel towards the inlet to the separator.

2. The apparatus of claim 1, wherein the angle is substantially 90° to said flow direction 'S'.

3. The apparatus of claim 2, wherein there are two sets of lamella separators in the apparatus, and wherein the receiving channel is substantially centrally situated therebetween.

4. The apparatus of claim 1, wherein said inlet means includes five spaced inlets in a base of the receiving channel.

5. The apparatus of claim 1, wherein the means to maintain grease, fat and the like suspended in the liquid in the receiving channel comprises a gas distribution device extending along the channel.

6. The apparatus of claim 5, wherein the distribution device comprises a pipe in the receiving channel with spaced air outlets.

7. The apparatus of claim 7, wherein the pipe is along one side of the receiving channel.

8. The apparatus of claim 6, wherein there are two pipes, extending along both sides of the receiving channel.

9. The apparatus of claim 1, further comprising means to remove scum from liquid in the receiving channel.

10. The apparatus of claim 9, wherein the means to remove scum comprises a weir at an end of the receiving channel opposite an inlet for the liquid.

11. The apparatus of claim 10, wherein the weir is a normally submerged weir.

12. The apparatus of claim 11 wherein the weir leads to a scum receiving having a normally closed valve means which is openable to lower the level of scum and/or liquid in the receiver.

13. The apparatus of claim 1, wherein said apparatus further comprises a separated-solids receiver means.

14. The apparatus of claim 13, wherein said separated-solids receiver means comprises a plurality of hoppers at one end of the apparatus and by means to direct the solids to the hoppers.

15. The apparatus of claim 14, wherein the means to direct the solids comprises a scraper device.

16. The apparatus of claim 15, wherein the scraper device comprises a frame with transverse scraper blades and means for reciprocating the scraper device.

17. The apparatus of claim 16, wherein the scraper device is operated intermittently.

18. The apparatus of claim 15, wherein there is a system of distributors mounted on the scraper device.

19. The apparatus of claim 18, wherein the distributors comprises pipes that are substantially parallel and set at approximately the pitch of the blades of the scraper device.

20. The apparatus of claim 1, further comprising means for cleaning said at least one lamella separator.

21. The apparatus of claim 20, wherein the cleaning means comprises means for passing a cleaning fluid towards a solids outlet of said at least one separator.

22. The of claim 21, wherein the means for passing a cleaning fluid comprises a system of distributors below said at least one separator.

23. The apparatus of claim 22, wherein the distributors comprise pipes extending in a transverse direction in the apparatus below said at least one separator.

24. The apparatus of claim 22, wherein the cleaning means is reciprocably mounted below said at least one separator.

25. The apparatus of claim 21, wherein the cleaning fluid is air.

26. The apparatus of claim 21, wherein the cleaning fluid is water.

* * * * *

UNITED STATES PATENT AND TRADEMARK OFFICE
CERTIFICATE OF CORRECTION

PATENT NO. : 5,658,461
DATED : August 19, 1997
INVENTOR(S) : Marsh

It is certified that error appears in the above-identified patent and that said Letters Patent is hereby corrected as shown below:

In the title page, item [30] Foreign Application Priority Data, please delete " 9332955 " and insert -- 9223955 --.

In column 6, claim 20 at line 17, please delete " means " and insert -- means (27) --.

In column 6, claim 21 at line 20, please delete " means for " and insert -- means (28) for --.

Signed and Sealed this

Twenty-eighth Day of July, 1998

*Attest:*

BRUCE LEHMAN

*Attesting Officer*    *Commissioner of Patents and Trademarks*